US012726463B2

(12) United States Patent
Wee

(10) Patent No.: US 12,726,463 B2
(45) Date of Patent: Sep. 1, 2026

(54) CIPHERTEXT-POLICY ATTRIBUTE-BASED ENCRYPTION WITH POST-QUANTUM SECURITY FOR BROADCAST SYSTEMS

(71) Applicant: NTT Research, Inc., Sunnyvale, CA (US)

(72) Inventor: Hoeteck Wee, Sunnyvale, CA (US)

(73) Assignee: NTT Research, Inc., Sunnyvale, CA (US)

( * ) Notice: Subject to any disclaimer, the term of this patent is extended or adjusted under 35 U.S.C. 154(b) by 157 days.

(21) Appl. No.: 18/860,674

(22) PCT Filed: May 1, 2023

(86) PCT No.: PCT/US2023/020532

§ 371 (c)(1),
(2) Date: Oct. 27, 2024

(87) PCT Pub. No.: WO2023/212391

PCT Pub. Date: Nov. 2, 2023

(65) Prior Publication Data

US 2026/0254796 A1 Aug. 27, 2026

Related U.S. Application Data

(60) Provisional application No. 63/336,834, filed on Apr. 29, 2022.

(51) Int. Cl.

| | |
|---|---|
| ***H04L 9/40*** | (2022.01) |
| ***H04L 9/00*** | (2022.01) |
| ***H04L 9/06*** | (2006.01) |

(52) U.S. Cl.
CPC .......... *H04L 63/0428* (2013.01); *H04L 9/008* (2013.01); *H04L 9/0618* (2013.01)

(58) Field of Classification Search
CPC .... H04L 63/0428; H04L 9/008; H04L 9/0618
See application file for complete search history.

(56) References Cited

U.S. PATENT DOCUMENTS

| | | | | |
|---|---|---|---|---|
| 12,238,212 | B2 * | 2/2025 | Datta | H04L 9/0869 |
| 2020/0127810 | A1 | 4/2020 | Hiromasa | |
| 2021/0377231 | A1 | 12/2021 | Soon-Shiong et al. | |
| 2024/0283647 | A1 * | 8/2024 | Datta | H04L 9/40 |

OTHER PUBLICATIONS

Cryptanalysis of Boyen's Attribute-Based Encryption Scheme in TCC 2013; 18 pgs; Cryptology ePrint Archive; Jan. 20, 2022.
International Search Report and Written Opinion in PCT/US23/20532; dated Aug. 4, 2023; 12 pgs.

* cited by examiner

*Primary Examiner* — Oleg Korsak
(74) *Attorney, Agent, or Firm* — CipherLaw

(57) ABSTRACT

A candidate broadcast encryption scheme for N users with parameter size poly(log N) is disclosed. Security of the scheme can be proved under a non-standard variant of the learning with errors (LWE) assumption, yielding a broadcast encryption scheme that is post-quantum secure with a security reduction to a simple assumption. Also disclosed is a ciphertext policy attribute-based encryption (CP-ABE) scheme for circuits of a-priori bounded polynomial depth where the parameter size is independent of the circuit size, where security can be proved under an additional non-standard assumption.

12 Claims, 4 Drawing Sheets

CIPHERTEXT-POLICY ATTRIBUTE-BASED ENCRYPTION WITH POST-QUANTUM SECURITY FOR BROADCAST SYSTEMS

CROSS-REFERENCE TO RELATED APPLICATIONS

This application is a national stage application, filed under 35 U.S.C. § 371, of International Patent Application No. PCT/US2023/020532, filed May 1, 2023, which claims the benefit of U.S. Provisional Application No. 63/336,834, filed Apr. 29, 2022, the contents of both of which are hereby incorporated in their entireties.

FIELD OF THE INVENTION

The disclosure relates to broadcast encryption as well as attribute-based encryption schemes.

BACKGROUND OF THE INVENTION

In ciphertext-policy attribute-based encryption (CP-ABE), ciphertexts ct are associated with a predicate f and a message m and keys sk with an attribute x, and decryption returns m when x satisfies f. Broadcast encryption is a special case of CP-ABE where the predicate is specified by a set $S \subseteq [N]$, and decryption returns m when x E S. In both cases, we require security against unbounded collusions, so that an adversary that sees a ciphertext along with secret keys for an arbitrary number of attributes $x_1, x_2, \ldots$ learns nothing about m as long as none of these attributes satisfies f.

Broadcast encryption has been an active area of research since their introduction in the 1990s, where a major goal is to obtain schemes with short parameters, that is, short ciphertexts ct, public keys mpk and secret keys sk. In a celebrated work from 2005, Boneh, Gentry and Waters presented the first broadcast encryption scheme with sub-linear-sized parameters from bilinear groups where $|ct|+|mpk|+|sk|=O(N^{1/2}), O(N^{1/3})$. On the other hand, in spite of the tremendous advances in lattice-based cryptography over the past decade, we do not know a LWE-based broadcast encryption scheme achieving $|ct|=o(N)$.

A recent line of works focuses on optimal broadcast encryption with parameter size poly(log N), where the first feasibility results relied on either multi-linear maps or indistinguishability obfuscation. Other work has constructed an optimal broadcast encryption scheme from bilinear groups and LWE. Still other work has presented a candidate lattice-inspired optimal broadcast encryption scheme that is plausibly post-quantum secure, but it was unable to provide a reduction to LWE or any simple lattice assumption.

BRIEF SUMMARY OF THE INVENTION

The invention relates to broadcast encryption as well as attribute-based encryption schemes. One example embodiment includes a candidate optimal broadcast encryption scheme with poly(log N)-sized parameters. We prove selective security of our scheme assuming evasive LWE, a non-standard variant of the LWE assumption where the distinguisher addition ally receives short Gaussian pre-images while avoiding zeroizing attacks. This yields the first candidate optimal broadcast encryption that is plausibly post-quantum secure, and enjoys a security reduction to a simple assumption. As a secondary contribution, we present a candidate CP-ABE scheme for circuits of a-priori bounded polynomial depth where the parameter size is independent of the circuit size, and prove security under an additional non-standard assumption.

Some embodiments of the invention include systems, methods, network devices, and machine-readable media for encrypting a message for transmitting to multiple recipients as a ciphertext by: receiving an access policy f, wherein the access policy: determines which recipient can recover a message, wherein each recipient is associated with an identity, each identity represented by a bit string of one specified length, and is represented as a set of executable instructions capable of being executed in polynomial time; receiving a public key comprising two matrices A and B from an authority, wherein width of A is based on the specified bit length of the recipient identities, and wherein B is a learning with errors matrix; receiving a message μ for encryption; homomorphically executing the executable instructions f on A to obtain $A_f$; sampling a learning with errors secret vector s; computing a first learning with errors sample $c_1$ based on the secret vector s and the matrix B; computing a second learning with errors sample $c_2$ based on the secret vector s and a tensor product of $A_f$ and a square matrix having 1's on the main diagonal, and 0's everywhere else; computing a sum $c_3$ of $c_2$ and the message μ; computing a ciphertext by concatenating $c_3$ with $c_1$; and transmitting the ciphertext by broadcast to a plurality of recipients.

Some further embodiments can include generating a secret key for one of the plurality of recipients by: receiving a bit string x specifying an identity for the one of the recipients; sampling a Gaussian vector r; computing a Gaussian pre-image of $(A \in x \otimes G) \otimes r$ with respect to B, wherein G is a predefined gadget matrix wherein each entry is 0 or a power of 2; and generating the secret key as a concatenation of r and the Gaussian pre-image.

Further embodiments can include decrypting the ciphertext at one of the recipients to recover the broadcast ciphertext by: multiplying $c_1$ from the ciphertext with the Gaussian pre-image from the secret key to obtain c', which is a learning with errors sample based on s and $(A-x \otimes G) \otimes r$; homomorphically evaluating f on c' to obtain c'', wherein c'' is a learning with errors sample based on s and $(A_f \otimes r)$; and combining c'', r from the secret key, and $c_3$ from the ciphertext to recover the message.

In some embodiments, the method is post-quantum secure.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

DETAILED DESCRIPTION

1 Technical Overview

Figure 1:
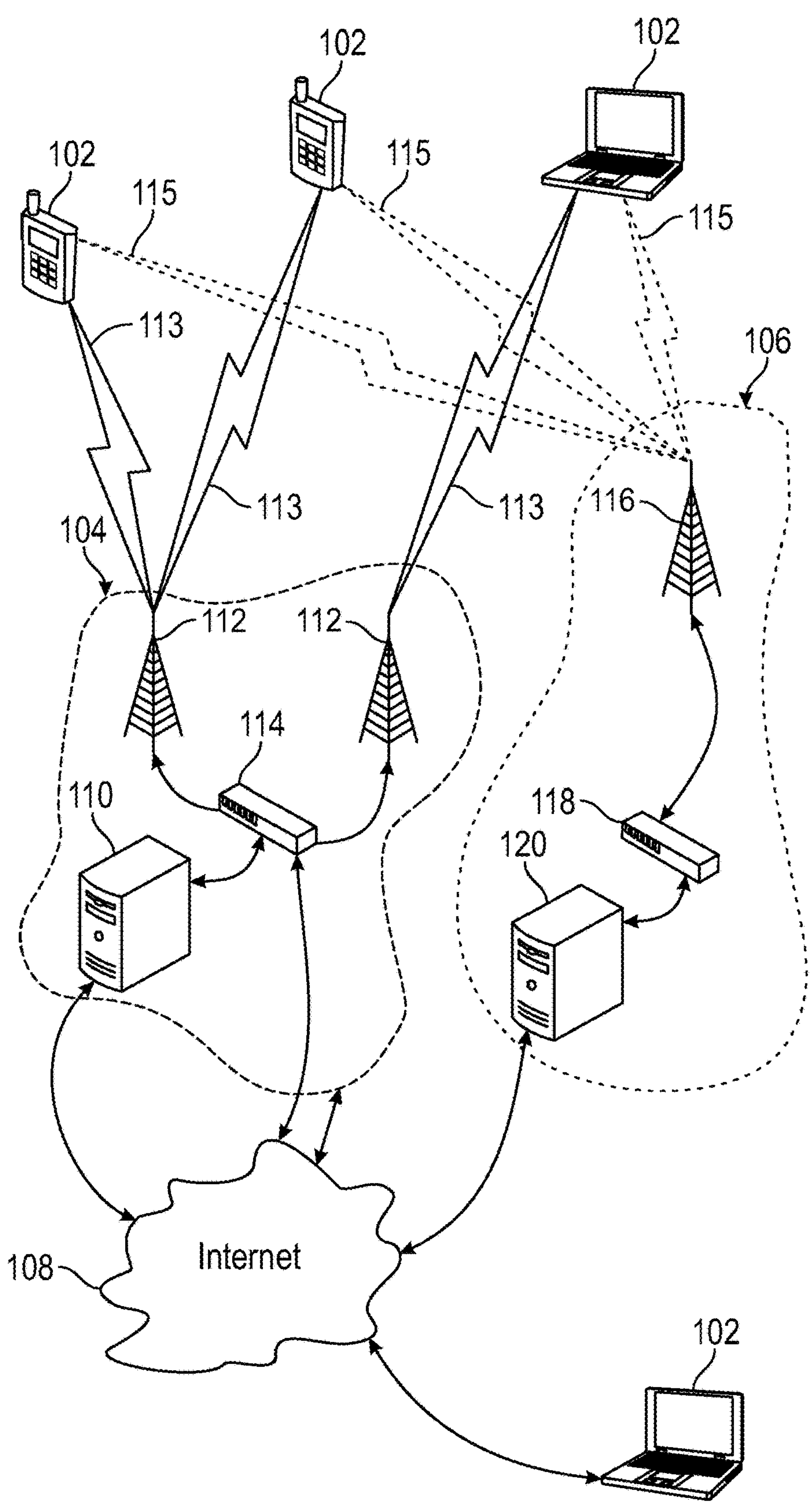
FIG. 1 is a block diagram illustrating a multimedia communication system suitable for use in various embodiments.

The disclosed optimal broadcast encryption starts with a one-key secure CP-ABE for circuits based on LWE, we randomize the secret keys to achieve security against collusions, and we show that for an appropriate family of circuits, the disclosed CP-ABE scheme implies optimal broadcast encryption. The schemes achieve randomization via exponentiation with random scalars in a bilinear group. Security relies on LWE in addition to a hardness assumption about the bilinear group, either the generic group model (GGM), or non-standard knowledge assumption (KOALA). Disclosed are new technical ideas that allow us to eliminate the use of bilinear maps, thereby achieving plausible post-quantum security.

Randomization via tensors. We randomize secret keys by tensoring with random Gaussian (row) vectors $$r \leftarrow \mathcal{D}^m_{\mathbb{Z},\chi},$$

which satisfies the following correctness and security properties:

Following prior ABE schemes based on LWE, given $$x \in \{0,1\}^\ell,\ A \in \mathbb{Z}_q^{n \times \ell m},$$

we can homomorphically evaluate a circuit f on $A-x\otimes G$ to obtain a quantity of the form $A_f-f(x)G$ via right-multiplication by some low-norm matrix $H_{A,f,x}$. This property is preserved under tensoring with random Gaussian vectors r: we can homomorphically evaluate f on $(A-x\otimes G)\otimes r^T$ to obtain $(A_f-f(x)G)\otimes r^T$ via right multiplication by $H_{A,f,x}\otimes I$. Note that homomorphic evaluation is not possible if we replace tensor product with vector multiplication (on the right).

Tensoring "amplifies" a single LWE secret s into Q independent LWE secrets $s_1, \ldots, s_Q$. More formally, under the LWE assumption, we have $$\left\{\left(\boxed{s(I_n \otimes r_i^T) + e_i}, r_i^T\right)\right\}_{i\in[Q]} \approx_c \left\{\left(s_i, r_i^T\right)\right\}_{i\in[Q]} \tag{1}$$

where $$s \leftarrow \mathbb{Z}_q^{nm},\ s_i \leftarrow \mathbb{Z}_q^n,\ e_i \leftarrow \mathcal{D}^n_{\mathbb{Z},\chi},\ r_i \leftarrow \mathcal{D}^m_{\mathbb{Z},\chi}.$$

In our analysis, Q corresponds to the number of key queries, and having Q independent secrets enables a hybrid argument over the key queries.

An evasive lattice assumption. We describe a simple variant of the evasive LWE assumption we put forth in this work. Fix an efficiently samplable distribution P over $$\mathbb{Z}_q^{n \times t}.$$

The evasive LWE assumption allows us to assert statements of the form $$\left(B, \boxed{sB+e}, B^{-1}(P)\right) \approx_c \left(B, c, B^{-1}(P)\right)$$

where $$B \leftarrow \mathbb{Z}_q^{n \times m},\ c \in \mathbb{Z}_q^{m'}$$

are uniformly random, m=O(n log q)≤t (so that P is wider than B). We have two distinguishing strategies in the literature:

- ignore $B^{-1}$ (P) and distinguish (B, sB+e) from (B, c)—this covers lattice attacks on LWE;
- compute $c^*=(sB+e')\cdot B^{-1}(P)\approx sP$ and distinguish the latter from uniform—this includes zeroizing attacks on multi-linear map and obfuscation candidates.

The evasive LWE assumption essentially asserts that these are the only distinguishing at tacks. Namely, $$\text{if } \left(B, p, \boxed{sB+e}, \boxed{sP+e''}\right) \approx_c (B, P, c, c''),$$
$$\text{then } \left(B, \boxed{sB+e}, B^{-1}, (P)\right) \approx_c \left(B, c, B^{-1}(P)\right)$$

where e" is a fresh noise vector. Note that $sP+e'' \approx_c c''$ implies that the high-order bits of $(sB+e')\cdot B^{-1}(P)\approx sP$ are pseudorandom, thereby defeating the second distinguishing strategy. Note that the error distribution $e\cdot B^{-1}$ (P) in c* is different from the fresh Gaussian error e". Differences in error distributions can make or break a scheme if c* has small norm, but we do not know attacks exploiting these differences when c* has large norm, as is the case here. Overall, we note that the statement of evasive LWE is fairly simple and general, and does not refer to tensor products, circuits, or structured distributions like $A-x\otimes G$ or $A_f$. That is, the assumption encapsulates a principled approach towards (conjectured) compu-tational hardness, rather than one that is tailored to our scheme.

Proof strategy. Our security proof proceeds in two steps: first, we rely on evasive LWE to reduce security of our scheme to a simpler statement with no short Gaussians, and then we prove this latter statement from LWE, using (1) along the way. For the second step, we need to modify the scheme to perform homomorphic evaluation on $A-x\otimes I$ where A is a low-norm matrix, and we replaced the gadget matrix G with the identity matrix I; in the security proof, we will use the fact that if $A-x\otimes I$ is low-norm, then $$s((A - x\otimes I)\otimes r^\top) \approx s(I\otimes r^\top)\cdot(A - x\otimes I)$$

upon which we can invoke (1) to replace $s(I\otimes r^T)$ on the RHS with random.

Homomorphic evaluation on $A-x\otimes I$ works as before with G, except the noise growth is now doubly (instead of singly) exponential in circuit depth. This yields a CP-ABE scheme with $|ct|=poly(2^d, \log s)$ for $NC^1$ circuits of multiplicative depth d and size s, and we show that this is sufficient for optimal broadcast encryption. In particular, broadcast encryption for N users correspond to circuits of multiplicative depth O(log log N) and size O(N log N). To obtain a CP-ABE for a-prior bounded depth circuits with |ct|=poly (d,log s), we keep $A-x\otimes G$ as before, and instead prove security based a new (falsifiable) "tensor LWE" assumption in the second step.

1.1 The Disclosed CP-ABE Schemes

The CP-ABE schemes are disclosed in more detail. The schemes rely on the following strengthening of our earlier statement of evasive LWE: we consider distributions over pairs of matrices (A', P) together with auxiliary input aux (instead of just P) and require that $$\text{if } \left(A', B, p, \boxed{sA+e'}, \boxed{sB+e}, sP+e'', aux\right) \approx_c (A', B, P, c', c, c'', aux), \tag{2}$$

$$\text{then } \left(A', B, \boxed{sA+e'}, \boxed{sB+e}, B^{-1}(P), aux\right) \approx_c \left(A', B, c', c, B^{-1}(P), aux\right)$$

In our applications, the auxiliary input includes the coin tosses used to sample A', P, which rules out obfuscation-based counter-examples.

A one-key secure CP-ABE. We consider CP-ABE for circuits $$f:\{0,1\}^{\ell} \to \{0,1\}$$

of depth d and size s. We begin with a one-key secure CP-ABE (where we use curly underlines in place of noise terms):

$$mpk := B_1 \leftarrow \mathbb{Z}_q^{n\times m}, A \leftarrow \mathbb{Z}_q^{n\times \ell m}, u^T \leftarrow \mathcal{D}_{\mathbb{Z},\chi}^m$$
$$ct_f := sA_f u^T + \mu\cdot g, sB_1, \text{ where } s \leftarrow \mathbb{Z}_q^n$$
$$sk_x := B_1^{-1}(A - x\otimes G)$$

Note that the ciphertext size is independent of $\ell$. Decryption for f(x)=0 uses $(A-x\otimes G)\ H_{A,f,x}=A_f-f(x)G$, which implies $$sB_1\cdot B_1^{-1}(A-x\otimes G)\cdot H_{A,f,x}\cdot u^{\top} \approx sA_f u^{\top}.$$

Next, we show that the scheme is one-key secure assuming LWE and evasive LWE. Intuitively, evasive LWE says that we can replace the terms $sB_1$, $$B_1^{-1}(A-x\otimes G)$$

with their product $s(A-x\otimes G)$. Then, it suffices to show that μ is hidden given $$B_1, A, sA_f u^{\top} + \mu\cdot g, s(A-x\otimes G)$$

Next, we can write $sA_f u^T$ in terms of $s(A-x\otimes G)$ and $f(x)\cdot sGu^T$ using homomorphic computation. Since f(x)=1, it suffices to show that μ is hidden given $$B_1, A, sGu^{\top} + \mu\cdot g, s(A-x\otimes G)$$

which follows quite readily from LWE.

Note that this scheme is insecure if the adversary is allowed to make two key queries: given secret keys for $0^{\ell}$ and $1^{\ell}$, an adversary can compute $sA, s(A-1^{\ell}\otimes G)$, substract the two to obtain $s(1^{\ell}\otimes G)$ and solve for s and thus μ. To defeat this attack, we randomize the secret keys by tensoring with random Gaussian vectors.

First modification. We replace $A-x\otimes G$ in sk with $(A-x\otimes G)\otimes r^T$ and $sA_f u^T$ in ct with $s(A_f u^T \otimes I)$, so that $$ct_f := s(A_f u^{\top}\otimes I) + \mu\cdot g, sB_1, \text{ where } s \leftarrow \mathbb{Z}_q^n$$
$$sk_x := B_1^{-1}((A-x\otimes G)\otimes r^{\top}), r^{\top}$$

Decryption Computes the Following Quantities:

$$(s(A_f\otimes I)+\mu\cdot g)\cdot(I\otimes r^{\top}) \approx s(A_f\otimes r^{\top}) + \mu\cdot g\cdot(I\otimes r^{\top})$$
$$sB_1\cdot B_1^{-1}((A-x\otimes G)\otimes r^{\top})\cdot(H_{A,f,x}\otimes I) \approx s(A_f\otimes r^{\top})$$

and subtracts the two to recover μ. The attacker from before now learns $$s(A\otimes r_1^{\top}), s\left(A-1^{\ell}\otimes G\right)\otimes r_2^{\top}$$

and since $r_1\neq r_2$ w.h.p., we can no longer carry out the attack from before.

We do not know an attack on the preceding scheme. However, adapting the security proof for the one-key setting to the many-key setting runs into two difficulties. Upon applying evasive LWE as before, we want to argue that μ is hidden given $$B_1, A, s(A_f u^{\top}\otimes I) + \mu\cdot g, \{s((A-x_i\otimes G)\otimes r_i^{\top}), r_i^{\top}\}_{i\in[Q]}$$

The first difficulty lies in handling $s(A_f u^T\otimes I)$: using homomorphic computation as before allows us to write $$s(A_f u^{\top}\otimes r_i^{\top})$$

in terms of $$s((A-x_i\otimes G)\otimes r_i^{\top}) \text{ and } f(x_i)\cdot s(Gu^{\top}\otimes r_i^{\top}).$$

We then need to bridge the gap $$\{s(A_f u^\top \otimes r_i^\top)\}_{i\in[Q]}$$

(what we know how to simulate) and $s(A_f u^T \otimes I)$ (what appears in the ciphertext). The next modification addresses this difficulty while relying only on the LWE assumption.

This leaves us with arguing pseudorandomness of $$\left\{s\left((A - x_i \otimes G) \otimes r_i^T\right), r_i^T\right\}_{i\in[Q]},$$

for which we present two solutions. The first (and less satisfactory) is to simply assert pseudorandomness via a new assumption, which we refer to as tensor LWE. This assumption is qualitatively different from evasive LWE in that there are no Gaussian pre-images. The second solution relies only on the LWE assumption, but incurs a $2^d$ blow-up, which is nonetheless sufficient for optimal broadcast encryption.

Second modification. We mask $s(A_f \otimes I)$ in the cipertext with a fresh LWE sample $s_0 A_0 + e_0$ and during decryption, compute $$s(A_f \otimes r^\top) \approx \overbrace{(s(A_f \otimes I_m) + s_0 A_0 + e)}^{ct} \cdot (1 \otimes \overbrace{r^\top}^{sk}) - \overbrace{(s_0 B_0 + e_0)}^{ct} \cdot \overbrace{B_0^{-1}(A_0 r^\top)}^{sk} \tag{4}$$

where $s_0 B_0 + e_0$ appears in $ct_f$ and $$B_0^{-1}(A_0 r^\top)$$

in $sk_x$. This yields the following CP-ABE scheme for bounded depth circuits:

$$mpk := A_0, B_0 \leftarrow \mathbb{Z}_q^{n\times m}, B_1 \leftarrow \mathbb{Z}_q^{mn\times m^2}, A \leftarrow \mathbb{Z}_q^{n\times \ell m}$$
$$ct_f := s_0 B_0, s(A_f \otimes I_m) + s_0 A_0 + \mu \cdot g, sB_1, \text{ where } s \leftarrow \mathbb{Z}_q^{mn}, s_0 \leftarrow \mathbb{Z}_q^n$$
$$sk_x := B_0^{-1}(A_0 r^\top), B_1^{-1}((A - x \otimes G) \otimes r^\top), r^\top, \text{ where } r \leftarrow \mathcal{D}_{\mathbb{Z},\chi}^m$$

Decryption for f(x)=0 computes (approximately)

$$\mu \cdot g \cdot \left(1 \otimes r^T\right) \approx (s(A_f \otimes I_m) + s_0 A_0 + \mu \cdot g) \cdot \left(1 \otimes r^T\right) - s_0 B_0 \cdot B_0^{-1}\left(A_0 r^T\right) + sB_1 \cdot B_1^{-1}\left((A - x \otimes G) \otimes r^T\right) \cdot (H_{A,f,x} \otimes I)$$

Again, via the evasive LWE assumption (upon additionally combining $B_0$, $B_1$ into a single matrix B), ABE security reduces to proving pseudorandomness of $$A_0, A, u^T, \overbrace{s\left(A_f u^T \otimes I\right) + s_0 A_0}^{c'}, \left\{s\left((A - x_i \otimes G) \otimes r_i^T\right), s_0 A_0 r_i^T, r_i^T\right\}_{i\in[Q]}$$

Observe that $$s_0 A_0 r_i^T \approx c' \cdot r_i^T - s\left(A_f u^T \otimes r_i^T\right)$$

We can then use the LWE assumption with secret $s_0$ to replace c' with random. This leaves us with proving pseudorandomness of $$A_0, A, u^T, \left\{s\left((A - x_i \otimes G) \otimes r_i^T\right), s\left(A_f u^T \otimes r_i^T\right), r_i^T\right\}_{i\in[Q]}$$

At this point, we can apply homomorphic computation to $$s((A - x_i \otimes G) \otimes r_i^\top)$$

as before in the one-key scheme, upon which we are left with proving pseudorandomness of $$A, u^T, \left\{s\left((A - x_i \otimes G) \otimes r_i^T\right), s\left(u^T \otimes r_i^T\right), r_i^T\right\}_{i\in[Q]} \tag{5}$$

The tensor LWE assumption essentially states that the above distribution is pseudorandom.

Third modification. The third and final modification allows us to handle the second difficulty without introducing the additional tensor LWE assumption but with a $2^d$ blow-up. The idea is to replace G in $sk_x$ with $I_m$ and sample $$A \leftarrow \mathcal{D}_{\mathbb{Z},\chi}^{m\times \ell m}$$

so that $A - x \otimes I_m$ has low-norm:

$$mpk := A_0, B_0 \leftarrow \mathbb{Z}_q^{n\times m}, B_1 \leftarrow \mathbb{Z}_q^{m^2 \times O(m^2 \log q)}, A \leftarrow \mathcal{D}_{\mathbb{Z},\chi}^{m\times \ell m}$$
$$ct_f := s_0 B_0, s(A_f \otimes I_m) + s_0 A_0 + \mu \cdot g, sB_1, \text{ where } s \leftarrow \mathbb{Z}_q^{m^2}, s_0 \leftarrow \mathbb{Z}_q^n$$
$$sk_x := B_0^{-1}\left(A_0 r^T\right), B_1^{-1}\left((A - x \otimes I) \otimes r^T\right), r^T, \text{ where } r \leftarrow \mathcal{D}_{\mathbb{Z},\chi}^m$$

In the security proof, instead of (5), we need to prove pseudorandomness of $$A, u^T, \left\{s\left((A - x_i \otimes I_m) \otimes r_i^T\right), s\left(u^T \otimes r_i^T\right), r_i^T\right\}_{i\in[Q]}$$

Both $A - x_i \otimes I$ and $u^T$ have low-norm, so $$s\left((A - x_i \otimes I_m) \otimes r_i^T\right) \approx s\left(I \otimes r_i^T\right) \cdot (A - x_i \otimes I)$$
$$s\left(u^T \otimes r_i^T\right) \approx s\left(I \otimes r_i^T\right) \cdot u^T$$

We may then invoke (1) to replace $$s\left(I \otimes r_i^T\right) \text{ with } s_i \leftarrow \mathbb{Z}_q^m,$$

upon which it suffices to prove pseudorandomness of $$A, u^T, \{s_i(A - x_i \otimes I_m), s_i u^T\}_{i \in [Q]}$$

This in turn follows from LWE via a straight-forward hybrid argument over i∈[Q].

2 Preliminaries

Notations. We use boldface lower case for row vectors (e.g. v) and boldface upper case for matrices (e.g. V). For integral vectors and matrices (i.e., those over Z), we use the notation |v|, |V| to denote the maximum absolute value over all the entries. We use $v \leftarrow \mathcal{D}$ to denote a random sample from a distribution $\mathcal{D}$, as well as v←S to denote a uniformly random sample from a set S. We use $\approx_s$ and ≈c as the abbreviation for statistically close and compu-tationally indistinguishable.

Tensor product. The tensor product (Kronecker product) for matrices $A=(a_{i,j}) \in \mathbb{Z}^{\ell \times m}$, $B \in \mathbb{Z}^{n \times p}$ is defined as $$A \otimes B = \begin{bmatrix} a_{1,1}B, & \dots, & a_{1,m}B \\ \dots, & \dots, & \dots \\ a_{\ell,1}B, & \dots, & a_{\ell,m}B \end{bmatrix} \in \mathbb{Z}^{\ell n \times mp},$$

The mixed-product property for tensor product says that $$(A \otimes B)(C \otimes D) = (AC) \otimes (BD)$$

A useful corollary of the mixed-product property says that for any pair of row vectors u, v∈ $\mathbb{Z}^2$, $$u \otimes v = (u \otimes 1)(I_n \otimes v) = (1 \otimes v)(u \otimes I_n)$$
$$= u(I_n \otimes v) = v(u \otimes I_n)$$

We adopt the convention that matrix multiplication takes precedence over tensor product, so that we can write A⊗BC to mean A⊗BC).

2.1 Lattices Background

We use $\mathcal{D}_{\mathbb{Z},\chi}$ to denote the discrete Gaussian distribution over $\mathbb{Z}$ with standard deviation $\chi$ Learning with errors (LWE). Given n, m, q, $\chi \in \mathbb{N}$, the $LWE_{n,m,q,\chi}$ assumption states that $$(A, sA + e) \approx_c (A, c)$$

where $$A \leftarrow \mathbb{Z}_q^{n \times m}, s \leftarrow \mathbb{Z}_q^n, e \leftarrow \mathcal{D}_{\mathbb{Z}^m,\chi}, c \leftarrow \mathbb{Z}_q^m$$

Trapdoor and preimage sampling. Given any $$Z \in \mathbb{Z}_q^{n \times n'}, \sigma > 0,$$

we use $B^{-1}$ (Z, σ) to denote the distribution of a matrix Y sampled from $\mathcal{D}_{\mathbb{Z}^{m \times n'},\sigma}$ conditioned on BY=Z (mod q). We sometimes suppress or when the context is clear.

There is a p.p.t. algorithm TrapGen ($1^n$, q) that, given the modulus q≥2 and dimension n, outputs $$B \approx_s U(\mathbb{Z}_q^{n \times 2n\log q})$$

with a trapdoor τ. Moreover, there is a p.p.t. algorithm that given $$(B, \tau) \leftarrow TrapGen(1^n, q), Z \in \mathbb{Z}_q^{n \times n'},$$

and $$\sigma \geq 2\sqrt{n\log q},$$

outputs a sample from $B^{-1}$(Z, σ).

2.2 Attribute-Based Encryption

Syntax. A ciphertext-policy attribute-based encryption (CP-ABE) scheme for some class $\mathcal{F}$ consists of four algorithms:

- Setup ($1^\lambda$, $\mathcal{F}$)→(mpk, msk). The setup algorithm gets as input the security parameter $1^\lambda$ and class description $\mathcal{F}$. It outputs the master public key mpk and the master secret key msk.
- Enc(mpk, f,μ)→$ct_f$. The encryption algorithm gets as input mpk, f∈ $\mathcal{F}$, and a message μ∈{0,1}. It outputs a ciphertext $ct_f$.
- KeyGen(mpk, msk,x)→$sk_x$. The key generation algorithm gets as input mpk, msk and x∈$\{0,1\}^\ell$. It outputs a secret key $sk_x$.
- Dec(mpk, $sk_x$, $ct_f$)→m. The decryption algorithm gets as input $sk_x$ and $ct_f$ such that f(x)=0 along with mpk. It outputs a message μ.

Correctness. For all inputs x and f with f(x)=0 and all μ∈{0, 1}, we require $$Pr\left[Dec(mpk, sk_x, ct_f) = \mu : \begin{array}{l} (mpk, msk) \leftarrow \text{Setup}(1^\lambda, \mathcal{F}) \\ sk_x \leftarrow KeyGen(mpk, msk, x) \\ ct_f \leftarrow Enc(mpk, f, \mu) \end{array}\right] = 1 - negl(\lambda).$$

Security definition. For a stateful adversary $\mathcal{A}$, we define the advantage function $$Adv_{\mathcal{A}}^{ABE}(\lambda) := Pr\left[b = b' : \begin{array}{l} f \leftarrow \mathcal{A}(1^\lambda) \\ (mpk, msk) \leftarrow \text{Setup}(1^\lambda, \mathcal{F}) \\ (\mu_0, \mu_1) \leftarrow \mathcal{A}^{KeyGen(mpk,msk,\cdot)}(mpk) \\ b \leftarrow \{0, 1\}; ct_f \leftarrow Enc(mpk, f, \mu_b) \\ b' \leftarrow \mathcal{A}^{KeyGen(mpk,msk,\cdot)}(ct_f) \end{array}\right] - \frac{1}{2}$$

with the restriction that all queries x that $\mathcal{A}$ sent to KeyGen (mpk, msk,·) satisfy f(x)=0. An ABE scheme is selectively secure if for all PPT adversaries $\mathcal{A}$, the advantage $$Adv_{\mathcal{A}}^{ABE}(\lambda)$$

is a negligible function in λ. Similarly, say that an ABE scheme is very selectively secure for the advantage function:

$$Adv_{\mathcal{A}}^{ABE}(\lambda) := Pr\left[ b = b' : \begin{array}{l} (f, x_1, \ldots, x_Q) \leftarrow \mathcal{A}(1^\lambda) \\ (mpk, msk) \leftarrow \text{Setup}(1^\lambda, \mathfrak{F}) \\ sk_i \leftarrow KeyGen(mpk, msk, x_i), i = 1, \ldots, Q \\ (\mu_0, \mu_1) \leftarrow \mathcal{A}(mpk, sk_1, \ldots, sk_Q) \\ b \leftarrow \{0, 1\}; ct_f \leftarrow Enc(mpk, f, \mu_b) \\ b' \leftarrow \mathcal{A}(ct_f) \end{array} \right] - \frac{1}{2}$$

Broadcast encryption. Here, $$\mathcal{X} = \{0, 1\}^N, \mathcal{Y} = [N]$$

where we think of $\{0,1\}^N$ as the power set of [N] (i.e., set of all subsets of [N]), and $$P(S, y) = 1 \Leftrightarrow y \in S$$

As has been noted, very selective security for broadcast encryption implies selective security since an adversary can simply ask for all keys outside S.

3 Evasive LWE

A formal statement of the evasive LWE assumption, also having been stated informally, is provided.

Evasive LWE. Let Samp be a PPT algorithm that on input $1^\lambda$, outputs $$A' \in \mathbb{Z}_q^{n\times m'}, P \in \mathbb{Z}_q^{n\times t}, \text{aux} \in \{0, 1\}^*$$

We define the following advantage functions:

$$Adv_{\mathcal{A}_0}^{PRE}(\lambda) := Pr\left[\mathcal{A}_0\left(\boxed{sA' + e'}, \boxed{sB + e}, \boxed{sP + e''}, A', B, \text{aux}\right) = 1\right] - Pr[\mathcal{A}_0(c, c_0, c', A', B, \text{aux}) = 1], \quad (6)$$

$$Adv_{\mathcal{A}_1}^{POST}(\lambda) := Pr\left[\mathcal{A}_1\left(\boxed{sA' + e'}, \boxed{sB + e}, K, A', B, \text{aux}\right) = 1\right] - Pr[\mathcal{A}_1(c, c_0, K, A', B, \text{aux}) = 1] \quad (7)$$

where $$\begin{array}{l} (A', P, \text{aux}) \leftarrow Samp(1^\lambda) \\ B \leftarrow \mathbb{Z}_q^{n\times m}, s \leftarrow \mathbb{Z}_q^n, \\ c \leftarrow \mathbb{Z}_q^{m'}, c_0 \leftarrow \mathbb{Z}_q^m, c' \leftarrow \mathbb{Z}_q^t, \\ e \leftarrow \mathcal{D}_{\mathbb{Z},\chi}^m, e' \leftarrow \mathcal{D}_{\mathbb{Z},\chi}^{m'}, e'' \leftarrow \mathcal{D}_{\mathbb{Z},\chi}^t \\ K \leftarrow B^{-1}(P) \text{ with standard deviation } O(\sqrt{m\log q}) \end{array}$$

We say that the evasive LWE assumption holds if for every PPT Samp, $\mathcal{A}_1$, there exists another PPT $\mathcal{A}_0$ and a polynomial Q(·) such that $$Adv_{\mathcal{A}_0}^{PRE}(\lambda) \geq Adv_{\mathcal{A}_1}^{POST}(\lambda) / Q(\lambda) - negl(\lambda)$$

We consider parameter settings for which $LWE_{n,q,\chi}$ holds.

Remark 1 (restricted samplers). As noted elsewhere, we only require that the assumption holds for samplers where aux additionally contains all of the coin tosses used by Samp. This avoids obfuscation-based counter-examples where aux contains an obfuscation of a program related to a trapdoor for matrix P.

Remark 2 (noise magnitudes). For simplicity, we stated the assumption with all the LWE error terms e, e', e" having the same Gaussian parameter χ. It is straight forward to adapt the assumption and the scheme to a quantitatively weaker variant where the error terms in the post-condition (7) have a larger Gaussian parameter than those in the pre-condition.

Remark 3 (weaker pseudorandomness). For the security of our scheme, it suffices to consider a weaker variant of the assumption where only sA'+e' is required to be pseudorandom in the post-condition.

4 Main Constructions

In this section, we present our main constructions:

- a CP-ABE scheme for $NC^1$ achieving |ct|=poly($2^d$, log s, λ);
- an "optimal" broadcast encryption scheme for N users with |mpk|+|ct|+|sk|=poly(log N,λ);
- a CP-ABE scheme for circuits achieving |ct|=poly(d,log s, λ);

The first scheme serves as the basis for the second and the third scheme. The first two schemes rely on evasive LWE whereas the third requires an additional "tensor LWE" assumption. We prove very selective security for all three schemes, which implies selective security for broadcast encryption.

4.1 Homomorphic Computation on Matrices

We recall basic homorphic computation on matrices used in prior LWE-based ABE.

Lemma 1 ($\text{EvalF}_G$, $\text{EvalFX}_G$). Fix parameters n, q, ℓ and m=O (n log q). Given a matrix A∈

$$\mathbb{Z}_q^{n\times \ell m}$$

and a circuit f:$\{0,1\}^\ell \rightarrow \{0, 1\}$ of depth d and size s, we can efficiently compute a matrix $$A_f \in \mathbb{Z}_q^{n\times m}$$

such that for all x∈$\{0,1\}^\ell$, there exists a matrix $H_{A,f,x} \in \mathbb{Z}^{\ell m\times m}$ with $|H_{A,f,x}|=m^{O(d)}\cdot s$ such that $$(A - x \otimes G) \cdot H_{A,f,x} = A_f - f(x)G \quad (8)$$

where $$G \in \mathbb{Z}_q^{n\times m}$$

is the gadget matrix. Moreover, $H_{A,f,x}$ is efficiently computable given A,f,x. We use $\text{EvalF}_G$(A, f), $\text{EvalFX}_G$ (A, f, x) to denote the algorithms computing $A_f$, $H_{A,f,x}$ respectively.

Low-norm variant. We also consider a variant where A has low-norm and we replace G with I: when deriving $A_f$, addition gates correspond to matrix addition and multiplication gates correspond to matrix multiplication. That is, $x_i+x_j$ corresponds to $A_i+A_j$ and $x_i \cdot x_j$ corresponds to $A_i \cdot A_j$ instead of $A_i \cdot G^{-1}(A_j)$. More generally, we can represent a circuit f of depth d and size s as a polynomial comprising the sum of s monomials, each of total degree at most $2^d$. Then, $A_f=f(A_1, \ldots, A_\ell)$. The magnitude of the noise squares with each multiplication gate, leading to noise growth that is doubly exponential in d.

Lemma 2 (EvalF, EvalFX). Fix parameters m, $\ell$. Given a matrix $A \in \mathbb{Z}^{m \times \ell m}$ and a circuit f: $\{0,1\}^\ell \rightarrow \{0,1\}$ of depth d and sizes, we can efficiently compute a matrix $A_f \in \mathbb{Z}^{m \times m}$ such that $|A_f|=(|A|m)^{O(2^d)} \cdot s$ and for all $x \in \{0,1\}^\ell$, there exists a matrix $H_{A,f,x} \in \mathbb{Z}^{\ell m \times m}$ with $|H_{A,f,x}|=(|A|m)^{O(2^d)} \cdot s$ such that $$(A - x \otimes I_m) \cdot H_{A,f,x} = A_f - f(x) I_m \tag{9}$$

Moreover, $H_{A,f,x}$ is efficiently computable given A, f, x. We use EvalF(A, f), EvalFX(A, f, x) to denote the algorithms computing $A_f$, $H_{A,f,x}$ respectively.

4.2 CP-ABE for $NC^1$ Circuits

We present our CP-ABE scheme for $NC^1$ circuits.

Setup($1^n$, $1^\ell$): Sample $$(B, \tau) \leftarrow TrapGen\left(1^{n+m^2}, q\right), A_0 \leftarrow \mathbb{Z}_q^{n \times m}, A \leftarrow \mathcal{D}_{\mathbb{Z},\chi''}^{m \times \ell m}, u \leftarrow \mathcal{D}_{\mathbb{Z},\chi''}^{m}$$

Output $$mpk := (B, A_0, A, u^\top), msk := \tau$$

Enc(mpk, f, $\mu \in \{0,1\}$). Compute $A_f$=EvalF(A, f). Sample $$s_0 \leftarrow \mathbb{Z}_q^n, s_1 \leftarrow \mathbb{Z}_q^{m^2}, e \leftarrow \mathcal{D}_{\mathbb{Z},\chi}^m, e_0 \leftarrow \mathcal{D}_{\mathbb{Z},\chi}^{O((n+m^2)\log q)},$$

Output $$ct_f := \Big(\overbrace{(s_0 \mid s_1)B + e_0}^{c_0}, \overbrace{(s_0 A_0 + s_1 (A_f u^\top \otimes I_m) + \mu \cdot g + e)}^{c}\Big)$$

KeyGen(msk,x): Sample $$r \leftarrow \mathcal{D}_{\mathbb{Z},\chi''}^m, K \leftarrow B^{-1}\begin{pmatrix} A_0 r^\top \\ (A - x \otimes I_m) \otimes r^\top \end{pmatrix},$$

using $\tau$ with standard deviation $$O\left(\sqrt{(n+m^2)\log q}\right).$$

Output $$sk_x := (K, r^T)$$

Dec(sk, x, ct, f): Compute $H_{A,f,x}$=EvalFX(A, f, x). Output $$\text{round}_{\beta_0}\left(c \cdot r^\top - c_0 \cdot K \cdot \begin{pmatrix} 1 \\ K_1 \cdot H_{A,f,x} u^\top \end{pmatrix}\right)$$

where round $\beta_0$ (x) outputs 0 if $|x|<\beta_0$ and 1 otherwise.

Parameters. Suppose $|H_{A,f,x}|$ is bounded by $\beta$. We set $$n = \text{poly}(\lambda, \log\beta), m = O(n\log q), \chi'',$$
$$\chi' = \lambda^{\omega(1)}, \chi = \beta \cdot \lambda^{\omega(1)}, \beta = (\chi'' m)^{O(2^d)} \cdot s$$
$$\beta_0 = \chi^2 \cdot \chi'' \cdot \beta \cdot \text{poly}(m), q = \beta_0 \cdot \lambda^{\omega(1)}$$

In particular, this means $$|mpk| = \ell \cdot \text{poly}(2^d, s, \lambda), |ct| = \text{poly}(2^d, s, \lambda), sk| = \ell \cdot \text{poly}(2^d, s, \lambda)$$

Correctness. Fix x, f such that f(x)=0. First, we have $$\begin{aligned} c_0 \cdot K \cdot \begin{pmatrix} 1 \\ H_{A,f,x} u^T \end{pmatrix} &\approx (s_0|s_1)B \cdot B^{-1}\begin{pmatrix} A_0 r^\top \\ A - x \otimes I_m) \otimes r^\top \end{pmatrix} \cdot \begin{pmatrix} 1 \\ K_1 \cdot H_{A,f,x} u^\top \end{pmatrix} \\ &= s_0 A_0 r^\top + s_1((A - x \otimes I_m) \otimes r^\top) \cdot (H_{A,f,x} u^\top \otimes 1) \\ &= s_0 A_0 r^\top + s_1((A - x \otimes I_m) \cdot H_{A,f,x} u^\top \otimes I_m) \cdot (1 \otimes r^\top) \\ &= s_0 A_0 r^\top + s_1(A_f u^T \otimes I_m) \cdot r^\top \end{aligned}$$

where the final equality uses $(A-x \otimes I_m) \cdot H_{A,f,x}=A_f$. This means $$\begin{aligned} c \cdot r^\top - c_0 \cdot K \cdot \begin{pmatrix} 1 \\ H_{A,f,x} u^\top \end{pmatrix} &\approx (s_0 A_0 + s_1(A_f u^\top \otimes I_m) + \mu \cdot g) \cdot r^\top - s_0 A_0 r^\top - s_1(A_f u^\top \otimes I_m) \cdot r^\top \\ &= \mu \cdot g \cdot r^\top \end{aligned}$$

In particular, the error term is bounded by $$|e \cdot r^\top| + \left| e_0 \cdot K \cdot \begin{pmatrix} 1 \\ H_{A,f,x} u^\top \end{pmatrix} \right| \le \chi^2 \cdot \chi'' \cdot \beta \cdot \text{poly}(m) \le \beta_0$$

Now, $g \cdot r^T$ is statistically close to uniform over $\mathbb{Z}_q$, and correctness follows as long as $q \ge \beta_0 \cdot \lambda^{\omega(1)}$.

4.3 Optimal Broadcast Encryption

To handle broadcast encryption with N users, we identify a user $x \in [N]$ with a bit string $x \in \{0,1\}^{\lceil \log N \rceil}$. Let $I_y(\cdot)$ be the point function wrt y, that is, $$I_y(x) = \begin{cases} 1 & \text{if } x = y \\ 0 & \text{otherwise} \end{cases}$$

We can then associate each set $S \subseteq [N]$ with the circuit $f_s$: $\{0,1\}^{\lceil \log N \rceil} \to \{0,1\}$ given by $$x \mapsto 1 - \sum_{y \in S} I_y(x) = \begin{cases} 0 & \text{if } x \in S \\ 1 & \text{if } x \notin S \end{cases}$$

It is easy to see that $f_s$ can be computed by a circuit of depth O(log log N) and size O(N log N):

each $I_y(\cdot)$ can be computed by a circuit of depth O(log log N) and size O(log N);

followed by an addition gate with fan-in N.

To support multiplication and addition of constants, we may assume that we have an extra 0-th input to the circuit that always carries the value 1. That is, we will set $\ell = \lceil \log N \rceil + 1$ in our CP-ABE scheme. We can then instantiate our CP-ABE scheme with $\beta = \lambda^{poly(\log N)}$. N log N (via the bound in Lemma 2) which yields a broadcast encryption scheme with $$|mpk| = \text{poly}(\log N, \lambda),\ |ct| = \text{poly}(\log N, \lambda),\ |sk| = \text{poly}(\log N, \lambda)$$

4.4 CP-ABE for Polynomial-Depth Circuits

Tensor LWE. We introduce an additional tensor LWE assumption which states that for all $x_1, \ldots, x_Q \in \{0,1\}^\ell$, we have $$A, \{s(I_m \otimes r_i^\top)(A - x_i \otimes G) + e_i, r_i^\top\}_{i \in [Q]} \approx_c A, \{c_i, r_i^\top\}_{i \in [Q]}$$

where $$A \leftarrow \mathbb{Z}_q^{m \times \ell m},\ s \leftarrow \mathbb{Z}_q^{mn},\ e_i \leftarrow \mathcal{D}_{\mathbb{Z},\chi}^{\ell m},\ r_i^T \leftarrow \mathcal{D}_{\mathbb{Z},\chi}^{m},\ c_i \leftarrow \mathbb{Z}_q^{\ell m}.$$

We consider the same paramet-ter settings as $LWE_{n,q,\chi}$, with $\ell$, Q=poly(λ). The analysis herein shows that if we use a low-norm A and replace G with I, then LWE implies tensor LWE.

CP-ABE scheme. We modify our CP-ABE scheme in Section 4.2 as follows:

we sample $$A \leftarrow \mathbb{Z}_q^{n \times \ell m},\ (B_1, \tau_1) \leftarrow TrapGen(1^{mn}, q),\ s_1 \leftarrow \mathbb{Z}_q^{mn};$$

we replace $I_m$ in ct, sk with the gadget matrix $$G \in \mathbb{Z}_q^{n \times m}$$

and we replace EvalF, EvalFX with $EvalF_G$, $EvalFX_G$ respectively;

we set χ"=poly(λ).

That is, we have:

$$ct_f := ((s_0 \mid s_1)B + e_0,\ s_0 A_0 + s_1(A_f u^\top \otimes G) + \mu \cdot g + e)$$
$$sk_x := \left(B^{-1}(A_0 r^\top (A - x \otimes G) \otimes r^\top), r^\top\right)$$

As before, we have: $|mpk| = \ell \cdot \text{poly}(\log\beta, \lambda)$, $|ct| = \text{poly}(\log\beta, \lambda)$, $|sk| = \ell \cdot \text{poly}(\log\beta, \lambda)$. Now, for circuits of depth d and size s, we have $|H_{A,f,x}| = \lambda^{O(d)} \cdot s$, which yields:

$$|mpk| = \ell \cdot \text{poly}(d, \log s, \lambda),\ |ct| = \text{poly}(d, \log s, \lambda),\ |sk| = \ell \cdot \text{poly}(d, \log s, \lambda)$$

Example Systems and Apparatuses of the Present Disclosure

The various embodiments may be implemented within a variety of communication systems, networks and/or mobile multi-media broadcast systems, an example of which is illustrated in FIG. 1. Specifically, FIG. 1 illustrates a communication system in which mobile receiver devices 102 may receive content from multimedia broadcast network 104, unicast network 106, or via the Internet 108. A typical multimedia broadcast network 104 includes a plurality of broadcast transmitters 112 controlled by a mobile broadcast network control center/broadcast operation center (BOG) 114. The multimedia broadcast network 104 broadcasts content from the broadcast transmitters 112 as mobile broadcast transmissions 113 for reception by the mobile receiver devices 102. Within the BOG 114, there may be one or more servers 110 for managing content broadcasts, and which provide a connection to the Internet 108.

In addition to the multimedia broadcast network 104, mobile receiver devices 102 may communicate via a unicast network 106, such as a cellular telephone network, WiFi network (not shown), WiMAX, etc. A typical cellular telephone network includes a plurality of cellular base stations 116 coupled to a network operations center 118. The network operations center 118 operates to connect voice and data calls between mobile receiver devices 102 and other network destinations, such as via telephone land lines (e.g., a POTS network, not shown) and the Internet 108.

Communications between mobile receiver devices 102 and the unicast network 106 may be accomplished via two-way wireless communication links 115 such as LTE, 4G, 3G, CDMA, TDMA, and other cellular telephone communication technologies. Such two-way wireless communication links 115 may enable users to stream multimedia content to receiver de vices (e.g., mobile devices).

To facilitate Internet data communications (e.g., streaming video feeds), the unicast network 106 will typically include one or more servers 120 coupled to, or within, the network operations center 118 that provide a connection to the Internet 108. Mobile receiver devices 102 may further connect to the Internet 108 via a wired connection when available, in which case the Internet 108 may serve as the unicast network. Mobile receiver devices 102 may also receive non-broadcast content over the Internet 108 using well known conventional web-based access protocols.

Generally, the operations for receiving and rendering content by a receiver device (e.g., the mobile receiver devices 102 discussed above) may be divided into separate and independent groups or categories of operations, and each group or category of operations may be assigned to a layer (e.g., physical layer, data link layer, etc.). In each of these layers, various hardware and/or software components may implement functionality that is commensurate with responsibilities assigned to that layer. For example, media streams (e.g., broadcast, point-to-point, etc.) are typically received in the physical layer, which may include a radio receiver, buffers, and processing components that perform the operations of demodulating, recognizing symbols within the radio frequency (RF) signal, and performing other operations for extracting raw data from the received RF signal.

Figure 2:
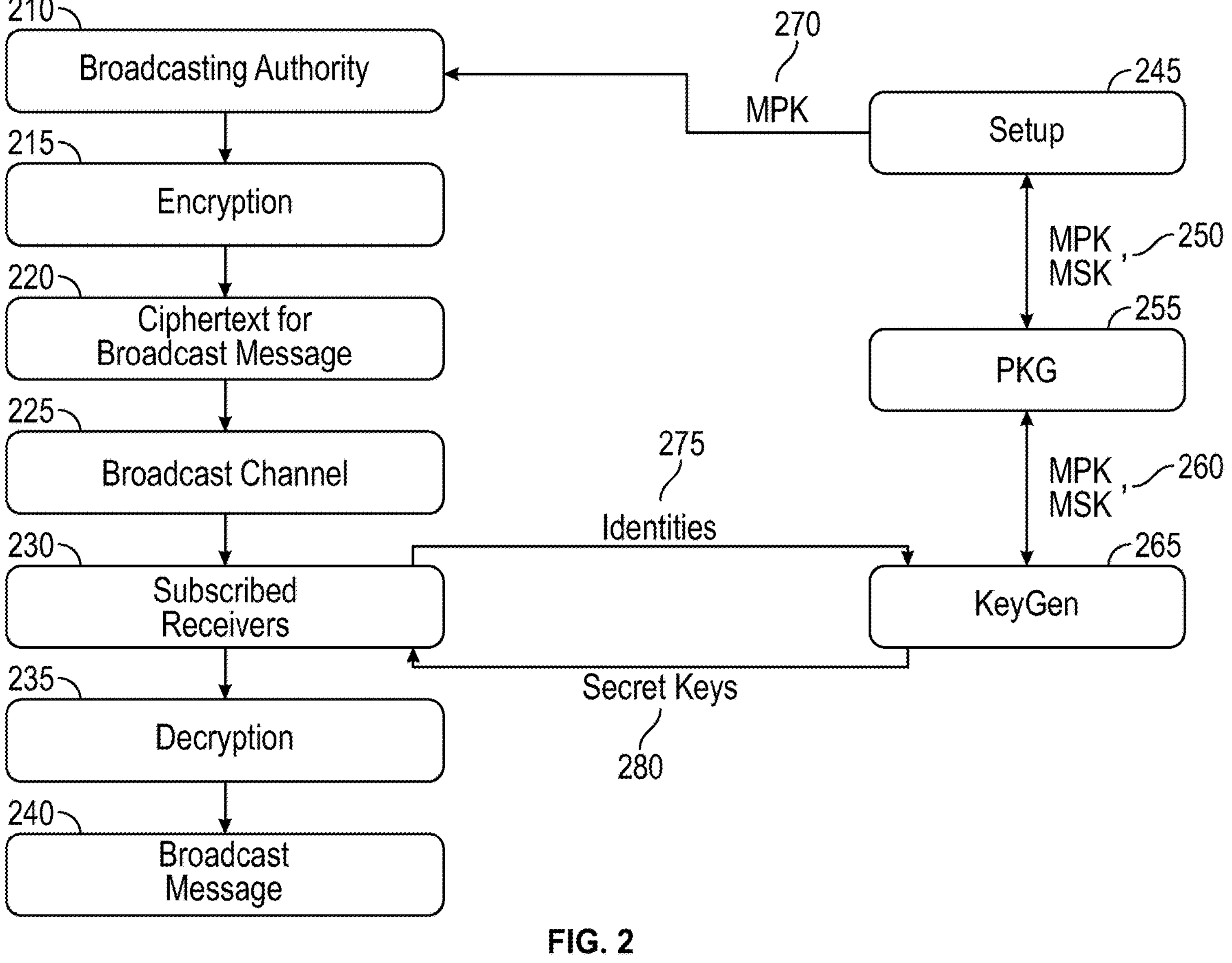
FIG. 2 illustrates an example computer-implemented method for the claimed broadcast encryption scheme.

FIG. 2 illustrates an example computer-implemented method for the claimed broadcast encryption scheme. In the illustrated example embodiment, setup routine generates master public key (MPK) 270 and provides it to the broadcasting authority 210. The key operations 245, 255, 265 may be performed at a centralized or trusted authority or third-party, which mayor may not be associated with or controlled by broadcast authority 210. The setup routine 245 also generates the master secret key (MSK) 250. Setup routine 245 may be called by the private key generator (PKG) 255. PKG 255 outputs system master public-key MPK 250 and the system master secret-key MSK 250, and makes MPK publicly available and keeps MSK as a secret. Key generation routine 265 receives the MPK and MSK, and user identities 275, and outputs secret keys 280 for each specific user.

Broadcasting authority 210 then employs MPK 270 to perform an encryption 215, which is then used as the ciphertext for a broadcast message 220. The broadcast message is then provided over a broadcast channel 225, which as described herein can take any wired or wireless form. The ciphertext is received by subscribed receivers 230 who have been pro vided with certain key material 280 in association with their identities 275 which have been provided to a key generation module 265. The secret keys 280 can be provided to receivers based on their identities 275. With the secret keys, the subscribed receivers can perform a decryption 235 of the broadcast ciphertext, and generate a resulting broadcast message 240.

Figure 3:
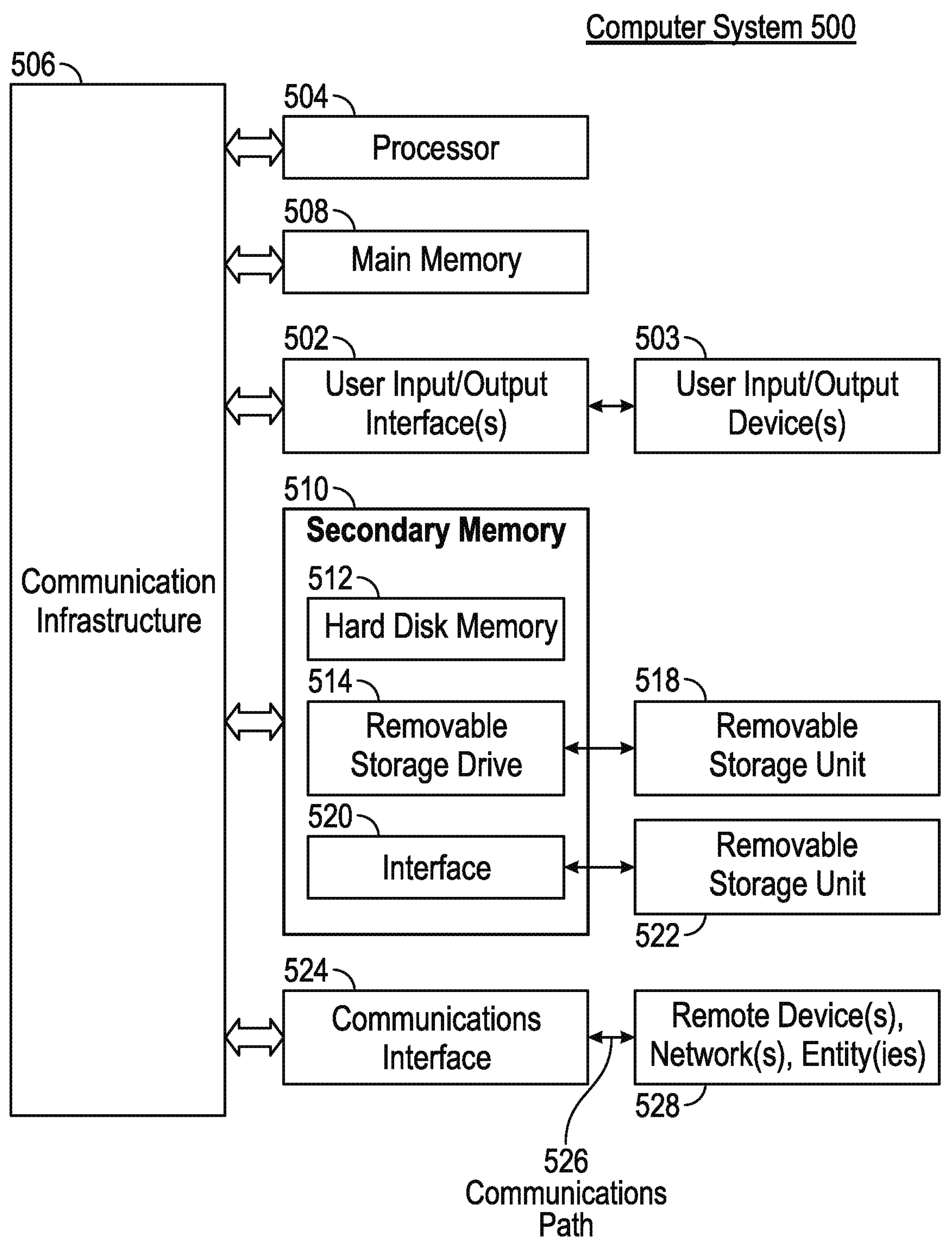
FIG. 3 illustrates an example computer system architecture for implementing the claimed systems and methods.
Figure 4:
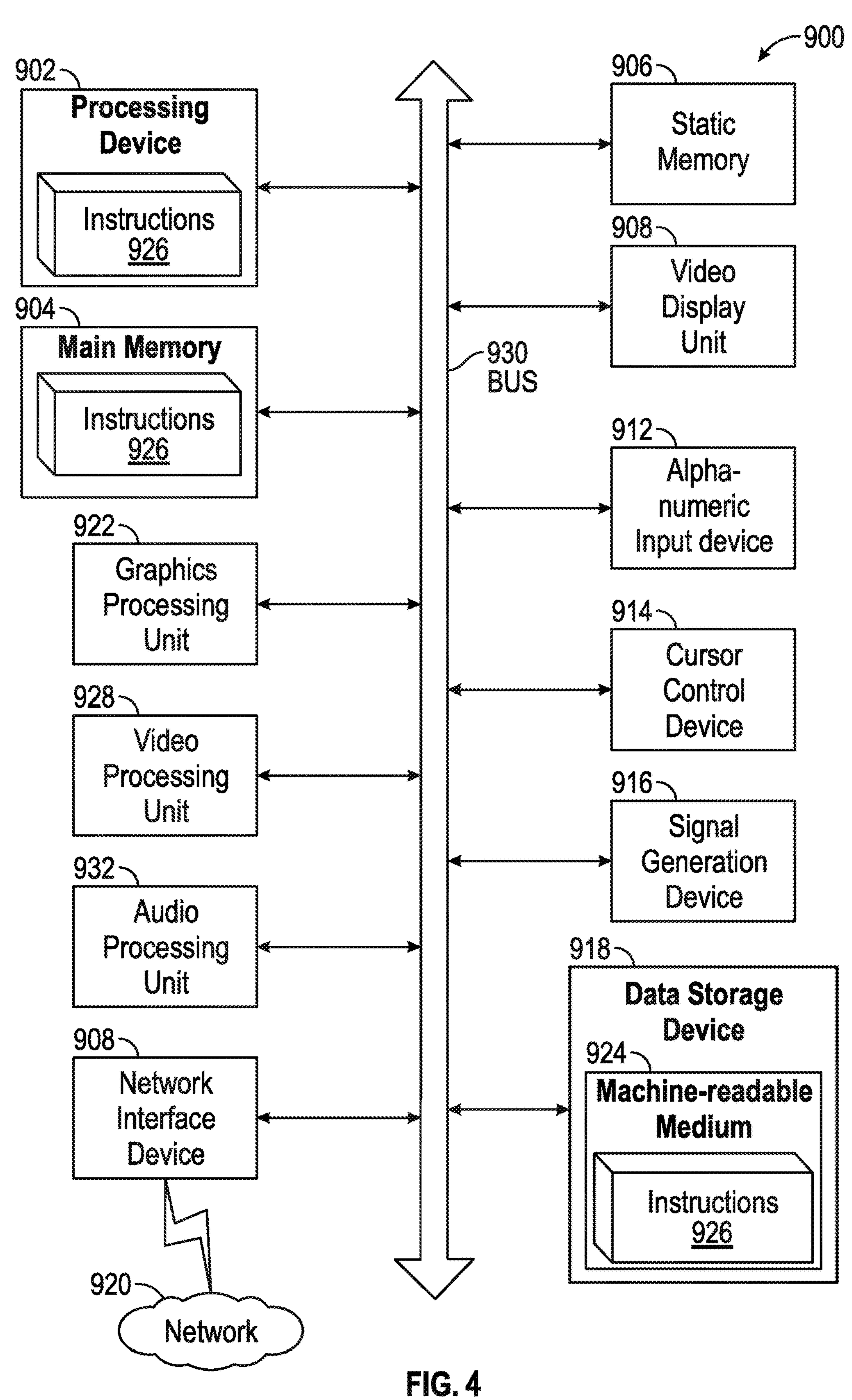
FIG. 4 illustrates further details of an example computer system architecture for implementing the claimed systems and methods.

FIGS. 3 and 4 depict example computer systems useful for implementing various embodiments described in the present disclosure. Various embodiments may be implemented, for example, using one or more computer systems, such as computer system 500 shown in FIG. 3. One or more computer system(s) 500 may be used, for example, to implement any of the embodiments discussed herein, as well as combinations and sub-combinations thereof.

Computer system 500 may include one or more processors (also called central process ing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer soft ware (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device (s), network(s), entity(ies) 528). For example, communications interface 524 may allow computer system 500 to communicate with external or remote device(s), network(s), entity (ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 4 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment. The machine may be a personal computer (PC), a tablet PC, a set-top box (STB), a Per sonal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and other wise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 3 and 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A method for encrypting a message for transmitting to multiple recipients as a ciphertext, the method comprising:
- receiving an access policy f, wherein the access policy:
  - determines which recipient can recover a message, wherein each recipient is associated with an identity, each identity represented by a bit string of one specified length, and
  - is represented as a set of executable instructions capable of being executed in polynomial time;
- receiving a public key comprising two matrices A and B from an authority, wherein width of A is based on the specified bit length of the recipient identities, and wherein B is a learning with errors matrix;
- receiving a message $\mu$ for encryption;
- homomorphically executing the executable instructions f on A to obtain $A_f$;
- sampling a learning with errors secret vector s;
- computing a first learning with errors sample $c_1$ based on the secret vector s and the matrix B;
- computing a second learning with errors sample $c_2$ based on the secret vector s and a tensor product of $A_f$ and a square matrix having 1's on the main diagonal, and 0's everywhere else;
- computing a sum $c_3$ of $c_2$ and the message $\mu$;
- computing a ciphertext by concatenating $c_3$ with $c_1$; and
- transmitting the ciphertext by broadcast to a plurality of recipients.

2. The method of claim 1, further comprising generating a secret key for one of the plurality of recipients by:
- receiving a bit string x specifying an identity for the one of the recipients;
- sampling a Gaussian vector r;

computing a Gaussian pre-image of $(A-x\otimes G)\otimes r$ with respect to B, wherein G is a predefined gadget matrix wherein each entry is 0 or a power of 2; and generating the secret key as a concatenation of r and the Gaussian pre-image.

3. The method of claim 2, further comprising decrypting the ciphertext at one of the recipients to recover the broadcast ciphertext by:

multiplying $c_1$ from the ciphertext with the Gaussian pre-image from the secret key to obtain c', which is a learning with errors sample based on s and $(A-x\otimes G)\otimes r$;

homomorphically evaluating f on c' to obtain c", wherein c" is a learning with errors sample based on s and $(A_f\otimes r)$; and combining c", r from the secret key, and $c_3$ from the ciphertext to recover the message.

4. The method of claim 1, wherein the method is post-quantum secure.

5. A computerized system for encrypting a message for transmitting over a broadcast network to multiple recipients as a ciphertext, the system comprising one or more modules configured for:

receiving an access policy f, wherein the access policy:

determines which recipient can recover a message, wherein each recipient is associated with an identity, each identity represented by a bit string of one specified length, and is represented as a set of executable instructions capable of being executed in polynomial time;

receiving a public key comprising two matrices A and B from an authority, wherein width of A is based on the specified bit length of the recipient identities, and wherein B is a learning with errors matrix;

receiving a message μ for encryption;

homomorphically executing the executable instructions f on A to obtain $A_f$;

sampling a learning with errors secret vector s;

computing a first learning with errors sample $c_1$ based on the secret vector s and the matrix B;

computing a second learning with errors sample $c_2$ based on the secret vector s and a tensor product of $A_f$ and a square matrix having 1's on the main diagonal, and 0's everywhere else;

computing a sum $c_3$ of $c_2$ and the message μ;

computing a ciphertext by concatenating $c_3$ with $c_1$; and transmitting the ciphertext by broadcast to a plurality of recipients.

6. The system of claim 5, further comprising one or more modules configured for generating a secret key for one of the plurality of recipients by:

receiving a bit string x specifying an identity for the one of the recipients;

sampling a Gaussian vector r;

computing a Gaussian pre-image of $(A-x\otimes G)\otimes r$ with respect to B, wherein G is a predefined gadget matrix wherein each entry is 0 or a power of 2; and generating the secret key as a concatenation of r and the Gaussian pre-image.

7. The system of claim 5, further comprising one or more modules configured for decrypting the ciphertext at one of the recipients to recover the broadcast ciphertext by:

multiplying $c_1$ from the ciphertext with the Gaussian pre-image from the secret key to obtain c', which is a learning with errors sample based on s and $(A-x\otimes G)\otimes r$;

homomorphically evaluating f on c' to obtain c", wherein c" is a learning with errors sample based on s and $(A_f\otimes r)$; and combining c", r from the secret key, and $c_3$ from the ciphertext to recover the message.

8. The system of claim 5, wherein the system is post-quantum secure.

9. A computer-readable storage medium storing computer-executable instructions that, when executed by one or more processors of a computing device, configure the one or more processors to encrypt a message for transmitting over a broadcast network to multiple recipients as a ciphertext, the medium comprising instructions for:

receiving an access policy f, wherein the access policy:

determines which recipient can recover a message, wherein each recipient is associated with an identity, each identity represented by a bit string of one specified length, and is represented as a set of executable instructions capable of being executed in polynomial time;

receiving a public key comprising two matrices A and B from an authority, wherein width of A is based on the specified bit length of the recipient identities, and wherein B is a learning with errors matrix;

receiving a message μ for encryption;

homomorphically executing the executable instructions f on A to obtain $A_f$;

sampling a learning with errors secret vector s;

computing a first learning with errors sample $c_1$ based on the secret vector s and the matrix B;

computing a second learning with errors sample $c_2$ based on the secret vector s and a tensor product of $A_f$ and a square matrix having 1's on the main diagonal, and 0's everywhere else;

computing a sum $c_3$ of $c_2$ and the message μ;

computing a ciphertext by concatenating $c_3$ with $c_1$; and transmitting the ciphertext by broadcast to a plurality of recipients.

10. The computer-readable storage medium of claim 9, further comprising instructions for generating a secret key for one of the plurality of recipients by:

receiving a bit string x specifying an identity for the one of the recipients;

sampling a Gaussian vector r;

computing a Gaussian pre-image of $(A-x\otimes G)\otimes r$ with respect to B, wherein G is a predefined gadget matrix wherein each entry is 0 or a power of 2; and generating the secret key as a concatenation of r and the Gaussian pre-image.

11. The computer-readable storage medium of claim 9, further comprising instructions for decrypting the ciphertext at one of the recipients to recover the broadcast ciphertext by:

multiplying $c_1$ from the ciphertext with the Gaussian pre-image from the secret key to obtain c', which is a learning with errors sample based on s and $(A-x\otimes G)\otimes r$;

homomorphically evaluating f on c' to obtain c", wherein c" is a learning with errors sample based on s and $(A_f\otimes r)$; and combining c", r from the secret key, and $c_3$ from the ciphertext to recover the message.

12. The computer-readable storage medium of claim 9, wherein the computation of the ciphertext is post-quantum secure.

* * * * *